US012344187B2

(12) United States Patent
Bittner (10) Patent No.: US 12,344,187 B2
(45) Date of Patent: Jul. 1, 2025

(54) WEB RETRACTOR WITH DAMPER TO RESIST SPOOL ROTATION

(71) Applicant: INDIANA MILLS & MANUFACTURING, INC., Westfield, IN (US)

(72) Inventor: Douglas W. Bittner, Indianapolis, IN (US)

(73) Assignee: INDIANA MILLS & MANUFACTURING, INC., Westfield, IN (US)

( * ) Notice: Subject to any disclaimer, the term of this patent is extended or adjusted under 35 U.S.C. 154(b) by 303 days.

(21) Appl. No.: 17/913,046

(22) PCT Filed: Mar. 26, 2021

(86) PCT No.: PCT/US2021/024330
§ 371 (c)(1),
(2) Date: Sep. 20, 2022

(87) PCT Pub. No.: WO2021/202275
PCT Pub. Date: Oct. 7, 2021

(65) Prior Publication Data
US 2023/0211750 A1 Jul. 6, 2023

Related U.S. Application Data

(60) Provisional application No. 63/001,662, filed on Mar. 30, 2020.

(51) Int. Cl.
*B60R 22/34* (2006.01)
*B60P 7/08* (2006.01)

(52) U.S. Cl.
CPC .......... *B60R 22/341* (2013.01); *B60P 7/0823* (2013.01)

(58) Field of Classification Search
CPC ... B60R 22/341; B60R 22/3413; B60R 22/28; B60R 22/4676; B60R 2022/288;
(Continued)

(56) References Cited

U.S. PATENT DOCUMENTS 3,946,989 A * 3/1976 Tsuda ...................... F16D 57/06
188/290
6,439,494 B1 * 8/2002 Specht ................ B60R 22/3413
242/379.1
(Continued)

FOREIGN PATENT DOCUMENTS

DE 102013217234 A1 * 3/2015 ......... B60R 22/3413

OTHER PUBLICATIONS

PCT International Preliminary Report and Written Opinion issued Sep. 29, 2022 in connection with PCT/US/2021/024330.
(Continued)

*Primary Examiner* — Sang K Kim
*Assistant Examiner* — Nathaniel L Adams
(74) *Attorney, Agent, or Firm* — Barnes & Thornburg LLP (57) ABSTRACT

A damped web retractor may include a frame, a spool including a spool shaft rotatably mounted to the frame, wherein the spool is configured to couple to one end of a web such that the web wraps around the spool as the spool shaft rotates relative to the frame in a web take up direction and such that the web unwraps from the spool as the spool shaft rotates in a web pay out direction, and a damper operatively coupled to the spool shaft, the damper configured to resist rotation of the spool shaft in at least one rotational direction.

20 Claims, 5 Drawing Sheets

(58) Field of Classification Search
CPC ....... B60P 7/0823; B60P 7/083; B60P 7/0838; B60P 7/0846
See application file for complete search history.

(56) References Cited

U.S. PATENT DOCUMENTS 6,810,997 B2    11/2004   Schreiber et al.
9,242,128 B2     1/2016   Macy
9,834,173 B2 * 12/2017   Michel ................ B60R 22/3413

OTHER PUBLICATIONS

PCT International Search Report and Written Opinion completed by the ISA/US on May 27, 2021 and issued in connection with PCT/US2021/024330.

* cited by examiner

WEB RETRACTOR WITH DAMPER TO RESIST SPOOL ROTATION

CROSS-REFERENCE TO RELATED APPLICATIONS

This patent application is a U.S. national stage entry of PCT Application No. PCT/US2021/024330, filed Mar. 26, 2021, which claims the benefit of and priority to U.S. Provisional Patent Application No. 63/001,662, filed Mar. 30, 2020, the disclosures of which are expressly incorporated herein by reference in their entireties.

FIELD OF THE INVENTION

This disclosure relates generally to web retractors, and more specifically to web retractors for restraining occupants and/or cargo in a mobile structure and/or for restraining one mobile structure relative to a stationary or other mobile structure.

BACKGROUND

Conventional web retractors operate to take up a web therein and to pay out the web therefrom. Some such web retractors are configured as locking web retractors configured to manually or automatically lock to prevent web pay out.

SUMMARY

This disclosure may comprise one or more of the features recited in the attached claims, and/or one or more of the following features and combinations thereof. In a first aspect, a damped web retractor may comprise a frame, a spool including a spool shaft rotatably mounted to the frame, the spool configured to couple to one end of a web such that the web wraps around the spool as the spool shaft rotates relative to the frame in a web take up direction and such that the web unwraps from the spool as the spool shaft rotates in a web pay out direction, and a damper operatively coupled to the spool shaft, the damper configured to resist rotation of the spool shaft in at least one rotational direction.

In a second aspect, a damped web retractor may comprise a frame, a flexible web, a spool including a spool shaft rotatably mounted to the frame, the spool configured to couple to one end of the web such that the web wraps around the spool as the spool shaft rotates relative to the frame in a web take up direction and such that the web unwraps from the spool as the spool shaft rotates in a web pay out direction, and a web guide movably mounted to the frame and defining a slot through which the web passes, the web guide moving to a web payout position relative to the frame in response to rotation of the spool in the web payout direction, and the web moving to a web take up position relative to the frame in response to rotation of the spool in the web take up direction, the slot of the web guide configured to engage the web in at least one of the web payout and take up positions of the web guide so as to damp rotation of the spool shaft in at least one rotational direction thereof.

In a further aspect, one or more of the features of the first and second aspects may be combined to produce a damped web retractor including any combination of one or more features of the first aspect and one or more features of the second aspect.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

This disclosure relates to a web retractor for taking up a web therein and for paying out the web therefrom. The web retractor will typically define or be part of a restraint system in which the web retractor is secured or is securable to a support structure, one end of a web is operatively coupled to the web retractor and a first releasable engagement member is typically coupled to the opposite end of the web for releasably engaging another structure such that the web thereby restrains the other structure relative to the support structure and/or restrains some type of body between the web retractor and the first releasable engagement member. In some embodiments, the web retractor may be mounted in a motor vehicle of any type, without limitation, to at least one frame component thereof and/or to at least one frame component of an occupant seat mounted in the motor vehicle, and the second releasable engagement member may be secured to at least another frame component of the motor vehicle and/or of the occupant seat such that the web, upon engagement of the first releasable engagement member with the second releasable engagement member, extends at least partially over or about at least a portion of the occupant seat to restrain a person, animal or object occupying the seat.

In other embodiments, the web retractor may define or be part of a restraint system for restraining an occupant carried in other types of mobile structures. For purposes of this disclosure, the term "mobile structure" may be understood to mean any of the following examples which include, but are not limited to, aircraft of any type, without limitation, watercraft of any type, without limitation, wheelchairs, personal mobility carts, towed vehicles including, but not limited to, trailers or the like. In such embodiments, the web retractor will typically be mounted to the mobile structure and/or to an occupant seat thereof, and the second releasable engagement member may be likewise secured to the mobile structure and/or to the occupant seat thereof such that the web, upon engagement of the first engagement member with the second engagement member, extends at least partially over or about the occupant seat of the mobile structure to restrain a person, animal or object occupying the seat.

In still other embodiments, the web retractor may define or be part of a restraint system for restraining cargo in a motor vehicle or in any type of mobile or stationary structure. In such embodiments, the web retractor will typically be mounted to the motor vehicle, mobile structure or stationary structure. In some such embodiments, a second releasable engagement member may be likewise secured to the motor vehicle, mobile structure or stationary structure such that the web, upon engagement of the first engagement member with the second engagement member, extends at least partially over or about the cargo to restrain the cargo relative to the motor vehicle, mobile structure and/or stationary structure. In other such embodiments, the motor vehicle, mobile structure and/or stationary structure may define or include another engagement structure suitable for releasable engagement with the first engagement member such that the web, upon engagement of the first engagement member with the engagement structure of the motor vehicle, mobile structure and/or stationary structure, extends at least partially over or about the cargo to restrain the cargo relative to the motor vehicle, mobile structure and/or stationary structure.

In still further embodiments, the web retractor may define or be part of a restraint system for restraining a motor vehicle or other mobile structure relative to a stationary or another mobile structure. In such embodiments, the web retractor will typically be mounted to the stationary or another mobile structure. In some such embodiments, a second releasable engagement member may be likewise secured to the motor vehicle or other mobile structure such that the web, upon engagement of the first engagement member with the second engagement member, restrains the motor vehicle or other mobile structure relative to the stationary structure or another mobile structure. In other such embodiments, the motor vehicle or other mobile structure may define or include another engagement structure suitable for releasable engagement with the first engagement member such that the web, upon engagement of the first engagement member with the engagement structure of the motor vehicle or other mobile structure, restrains the motor vehicle or other mobile structure relative to the stationary structure or another mobile structure.

In each of the foregoing embodiments, the web retractor may illustratively be a locking web retractor; that is, the web retractor may be lockable in a state in which the web is prevented from being paid out from the web retractor or in a state in which the web is prevented from being taken up in and paid out from the web retractor. In some such embodiments, as depicted in the example embodiment illustrated in the attached figures, the web retractor may be an inertial locking web retractor of any type and operable to automatically lock the web retractor in response to an inertial event in excess of an inertial threshold, examples of which include, but are not limited to, an automatic locking retractor (ALR) and an emergency locking retractor (ELR). Alternatively, the web retractor may be a manual locking retractor; that is, the web retractor may be locked manually, i.e., by manually actuating at least one locking component of the web retractor. In some such embodiments, the web retractor may be a ratcheting web retractor; that is, the web retractor may include a handle or lever configured to be manually actuated to incrementally rotate, i.e., ratchet, a spool shaft so as to incrementally take up web onto a spool when the web retractor is locked.

Figure 1:
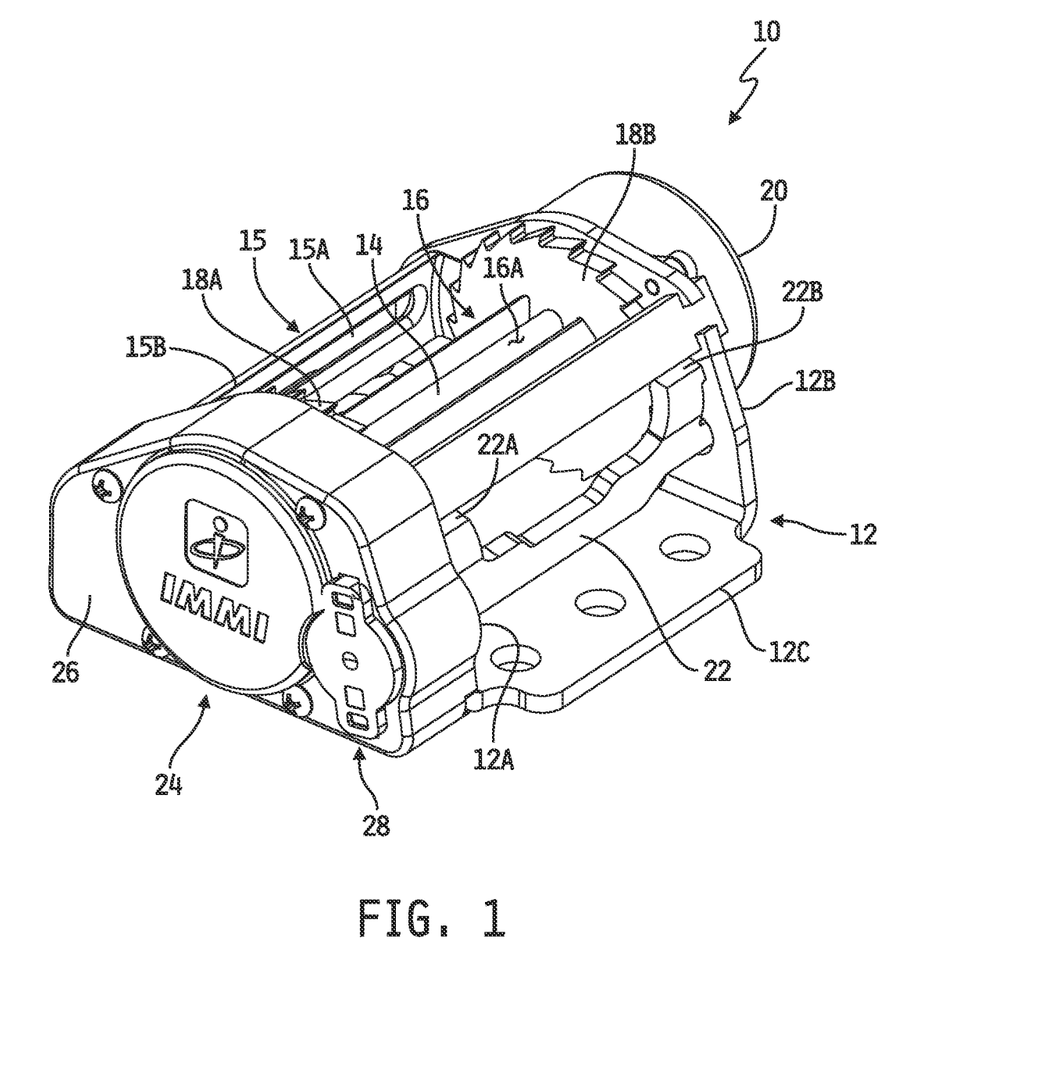
FIG. 1 is a perspective view of an embodiment of a damped web retractor.

Referring now to FIG. 1, an embodiment of a damped web retractor 10 is shown. In the illustrated embodiment, the retractor 10 includes a frame 12 having spaced-apart, upstanding side walls 12A, 12B opposite one another and interconnected along bottom edges thereof by a base wall 12C extending between the side walls 12A, 12B. A spool shaft or spindle 14 is rotatably mounted to the side walls 12A, 12B such that the spool shaft 14 rotates relative to the side walls 12A, 12B of the frame. In the illustrated embodiment, a spool 16 at least partially surrounds the spool shaft 14 and rotates therewith relative to the frame 12. Illustratively, the spool 16 defines at least one slot 16A therethrough which extends at least partially along the length of the spool shaft 14 for receiving one end of a web (not shown) for coupling of the one end of the web to the spool 16 and spool shaft 14 in a conventional manner. An opposite end of the web may illustratively be coupled to a releasable engagement member as described above. In some embodiments, a web guide 15 may be mounted to the frame 12 and may include a guide plate 15B defining therethrough a web slot 15A through which the web passes. In some such embodiments, the web guide 15 may be fixed in position relative to the frame 12, although in alternate embodiments the web guide 15 may be movably mounted, e.g., rotatably or pivotably, to the frame 12. An example of one such alternate embodiment is illustrated in FIGS. 4A-5B and will be described in detail below.

In the illustrated embodiment, a toothed gear or wheel 18A is coupled to the spool 16 and/or to the spool shaft 14 adjacent to the inner surface of the frame side wall 12A, and another toothed gear or wheel 18B is coupled to the spool 16 and/or to the spool shaft 14 adjacent to the inner surface of the frame side wall 12B such that the gears or wheels 18A, 18B rotate with the spool shaft 14 and the spool 16 relative to the frame. In some alternate embodiments, only one of the gears or wheels 18A, 18B may be included.

A power spring assembly 20 is illustratively mounted to the outer surface of the side wall 12B. The power spring assembly 20 is conventional and includes a power spring or so-called "main spring" of conventional construction and operatively coupled to or adjacent to a corresponding end of the spool shaft 14 which illustratively extends at least partially through the side wall 12B. The power spring or main spring of the power spring assembly 20 is illustratively configured in a conventional manner to bias the spool shaft 14, and thus the spool 16 and the gears or wheels 18A, 18B, to rotate in a web take up direction; that is, in a direction which causes the web to be wrapped around and thus taken up on the spool 16 as the combination of the spool shaft 14 and spool 16 rotates in the web take up direction. Illustratively, the power spring or main spring is configured to apply such bias regardless of whether the web is fully taken up on the spool 16 or is fully paid out from the retractor 10. In any case, the web can be dispensed from the retractor 10 by applying a force to the opposite end of the web, or to a portion of the web extending from the spool 16 of the retractor 10, that is greater than the biasing force of the power spring or main spring of the power spring assembly 20, thus causing the spool shaft 14, spool 16 and the gear(s) or wheel(s) 18A and/or 18B to rotate in a web pay out direction, opposite the web take up direction, and thereby pay out web from the retractor 10.

In the illustrated embodiment, the web retractor 10 further includes a locking pawl 22 rotatably or pivotably mounted to and between the side walls 12A, 12B of the frame 12. The locking pawl 22 illustratively defines a pair of spaced-apart ears or tabs 22A, 22B each positioned opposite a respective one of the gears or wheels 18A, 18B. In embodiments which include the locking pawl 22, the gear or wheel 18A and/or the gear or wheel 18B may be toothed at least partially about its periphery, and in the illustrated embodiment which includes both gears or wheels 18A, 18B, each such gear or wheel 18A, 18B is toothed. The teeth of the gear(s) or wheel(s) 18A and/or 18B are illustratively configured so as to engage the respective ear(s) or tab(s) 22A and/or 22B when the locking pawl 22 is rotated or pivoted relative to the side walls 12A, 12B to a spool locking position such that the ear(s) or tab(s) 22A and/or 22B prevent rotation of the gear(s) or wheel(s) 18A and/or 18B, and thus rotation of the spool shaft 14 and the spool 16, in the web pay out direction while still allowing the power spring or main spring of the power spring assembly 20 to rotate the spool shaft 14, spool 16 and gear(s) or wheel(s) 18A and/or 18B in the web take up direction. When the locking pawl 22 is rotated or pivoted relative to the side walls 12A, 12B to a spool unlocking position, the ear(s) or tab(s) 22A and/or 22B rotate or pivot away from, and thus disengage from, the teeth of the gear(s) or wheel(s) 18A and/or 18B to allow rotation of the spool shaft 14, spool 16 and the gear(s) or wheel(s) 18A, 18B in the web take up and pay out directions. The structure and operation of the locking pawl 22 is conventional.

The web retractor 10 further illustratively includes a spool shaft control assembly 24 including one or more spool shaft control components 24A operatively coupled to, or adjacent to, an opposite end 14A of the spool shaft 14 which extends at least partially through the side wall 12A of the frame 12 (see, e.g., FIGS. 2A and 2B), a cover or housing 26 mounted to the side wall 12A over the one or more spool shaft control components 24A and engaging at least a portion of the outer surface thereof, and a rotary damper 28 mounted to the cover or housing 26 and operatively coupled to at least one of the one or more spool shaft control components 24A. As will be described in detail below, the rotary damper 28 is configured to damp or attentuate rotation of the spool shaft 14 in at least one rotational direction thereof.

In some embodiments in which the web retractor 10 is an automatic locking retractor as described above with respect to FIG. 1, the one or more spool shaft control components 24A illustratively include at least a conventional inertia sensor or sensor assembly operatively coupled to an actuator configured to pivot the locking pawl 22 between the spool locking and unlocking positions described above. In such embodiments, the one or more spool shaft control components 24A operate to rotate or pivot the locking pawl 22 to the spool locking position, in which the ear(s) or tab(s) 22A, 22B of the locking pawl 22 rotate or pivot toward and engage the teeth of the toothed gear(s) or wheel(s) 18A, and/or 18B, under inertial locking conditions, e.g., in which the spool shaft 14 rotates with a rotational speed in the web pay out direction that is greater than a threshold rotational speed or in which the web retractor 10 is subject to inertia greater than an inertia threshold, and otherwise operate to rotate or pivot the locking pawl 22 to the spool unlocking position in which the ear(s) or tab(s) 22A, 22B of the locking pawl 22 rotate or pivot away from and disengage the teeth of the toothed gear(s) or wheel(s) 18A, and/or 18B. An example of this embodiment is illustrated in FIGS. 2A-3B and will be described in detail below. In some alternate embodiments, however, the spool shaft rotational locking operation just described may be accomplished solely by a plurality of conventional spool shaft locking components 24A operating on the spool shaft 14 in a conventional manner. In such embodiments, the locking pawl 22 may be omitted, and in other such embodiments the locking pawl 22 and the spool shaft locking assembly just described may both be included.

Figure 2A:
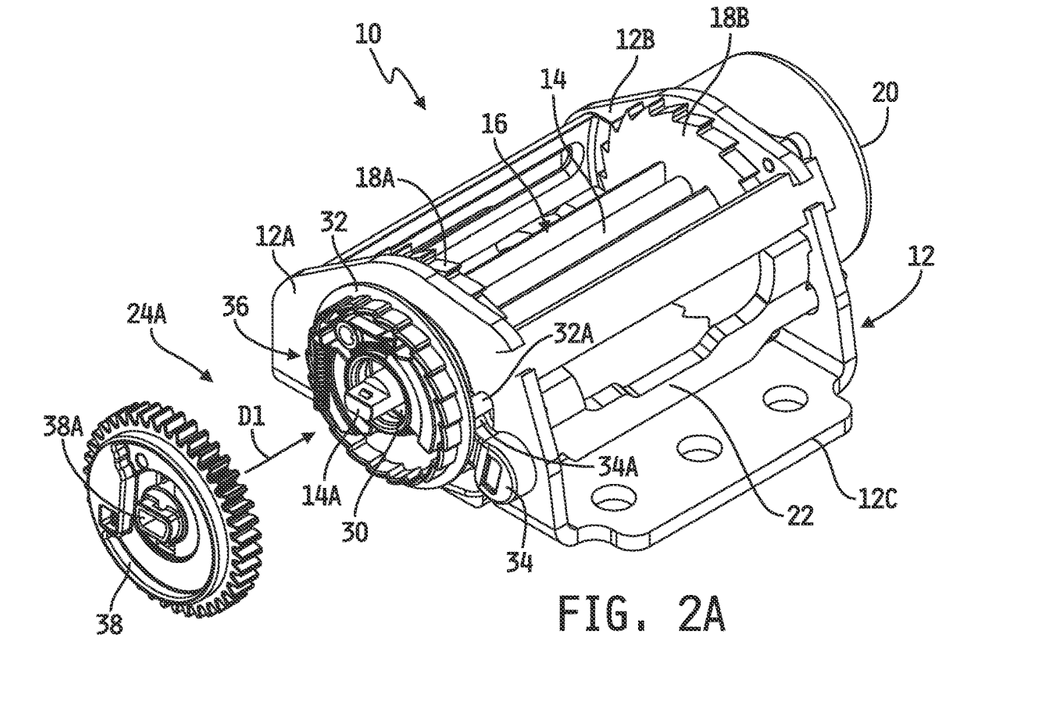
FIG. 2A is a perspective assembly view of a subassembly of the damped web retractor of FIG. 1.
Figure 2B:
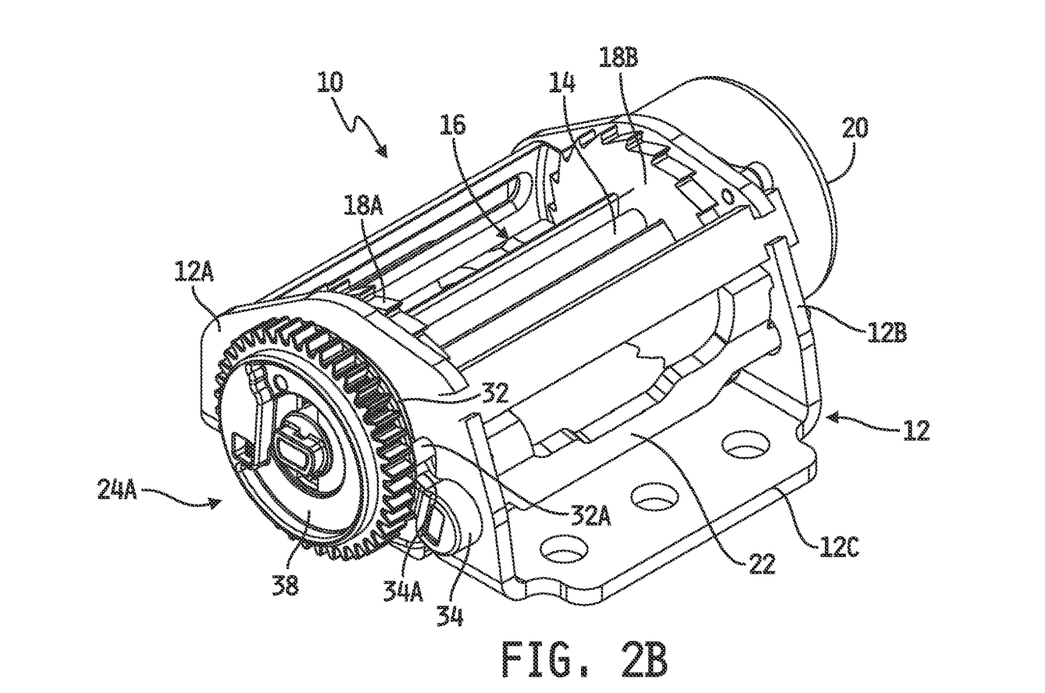
FIG. 2B is a perspective view of the subassembly of FIG. 2A as assembled.

Referring now to FIGS. 2A and 2B, an example embodiment is shown in which the one or more spool shaft control components 24A operate to rotate or pivot the locking pawl 22 between the spool locking and unlocking positions as described above. In the illustrated embodiment, the end 14A of the spool shaft 14 extends through the side wall 12A of the frame 12 and beyond the outer surface thereof. A shaft bushing 30 surrounds the spool shaft 14 and a toothed locking pawl actuator wheel 32 is received on an about the shaft bushing 30. The wheel 32 is rotatable relative to and about the bushing 30, and the bushing 30 isolates the wheel 32 from the spool shaft 14 such that the wheel 32 does not rotate with the spool shaft 14. An ear or tab 32A is coupled to and extends radially away from the wheel 32. One end 22C of the locking pawl 22 extends through the side wall 12A of the frame 12 (see FIG. 3C) and a locking pawl actuator 34 is coupled the end 22C of the locking pawl at or adjacent to an outer surface of the side wall 12A of the frame 12 as shown. An actuator ear or tab 34A extends from the actuator 34 toward and into engagement with the ear or tab 32A of the wheel 32. Illustratively, the locking pawl 22 is biased, e.g., via at least one spring, to the spool unlocking position illustrated in FIGS. 2A and 2B in which the ear(s) or tab(s) 22A, 22B of the locking pawl 22 are rotated or pivoted away from, and therefore disengaged from, the teeth of the toothed gear(s) or wheel(s) 18A, and/or 18B.

The spool shaft control components 24A further include an inertial sensing assembly 36, including a conventional inertial sensor/actuator combination, coupled to an outer surface of the locking pawl actuator gear or wheel 32. Another gear or wheel 38 is coupled to or adjacent to the end 14A of the spool shaft 14 such that the gear or wheel 38 rotates with the spool shaft 14. The sensor/actuator combination of the assembly 36 is configured to engage the gear or wheel 38 in response to the rotational speed of the wheel 38 in the web pay out direction exceeding a rotational speed threshold, and to otherwise not engage the gear or wheel 38. When, with the wheel 38 rotating in the web pay out direction, the sensor/actuator combination of the inertial sensing assembly 36 engages the wheel 38, further rotation of the wheel 38 causes the wheel 32 to rotate in a direction (clockwise in FIG. 2A) which causes the ear or tab 32A to engage the ear or tab 34A of the actuator 34 and rotate the actuator 34 in a direction (counterclockwise in FIG. 2A) that rotates or pivots the locking pawl 22 to the spool locking position in which the ear(s) or tab(s) 22A, 22B of the locking pawl 22 rotate or pivot toward and engage the teeth of the toothed gear(s) or wheel(s) 18A, and/or 18B. In embodiments in which the spool shaft rotational locking operation described above is accomplished by a conventional plurality of conventional spool shaft locking components 24A operating solely on the spool shaft 14, the actuator 34 may be omitted.

The structure and operation of the spool shaft locking components 24A illustrated in FIGS. 2A-2B and described above are conventional. In other embodiments, the inertial sensing assembly may alternately be configured with another conventional inertial sensor/actuator triggered not by the rotational speed of the spool shaft 14 but by the retractor 10 being subject to an inertial force, i.e., a g-force, that exceeds an inertial force threshold as described above.

Figures 3A, 3B:
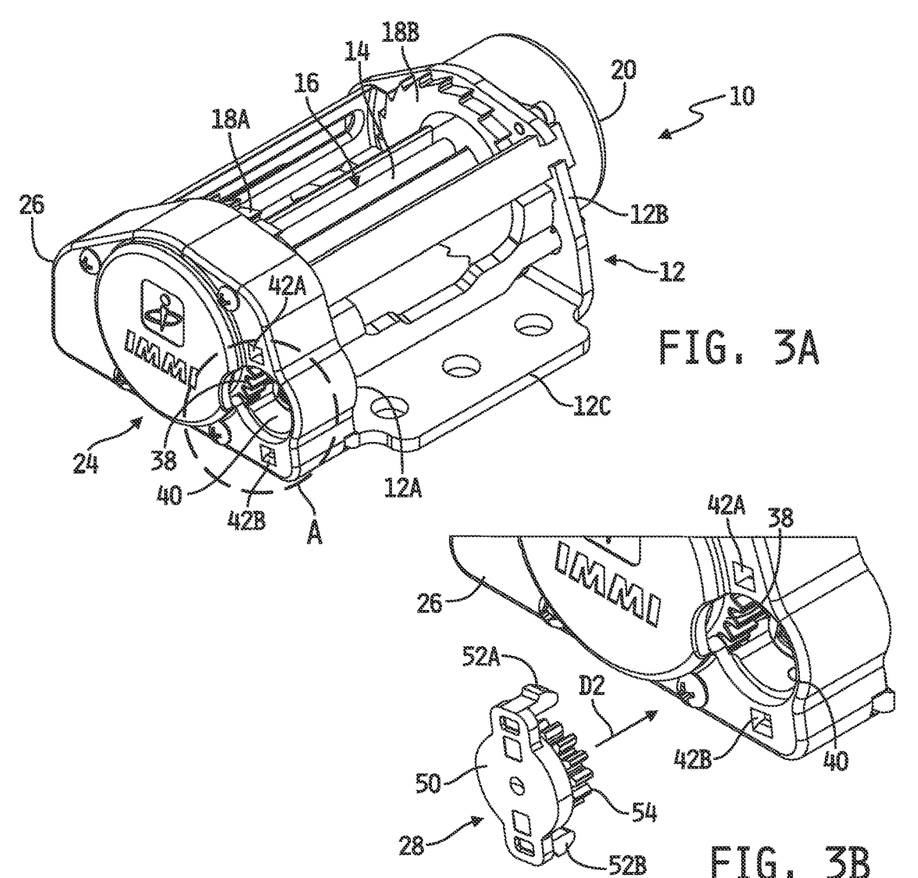
FIG. 3A is a perspective view of the subassembly of FIG. 2B shown with a locking component housing mounted to one of the sidewalls of the retractor frame.
FIG. 3B is a magnified perspective view of the portion A of FIG. 3A with a rotary damper shown in assembly.
Figure 3C:
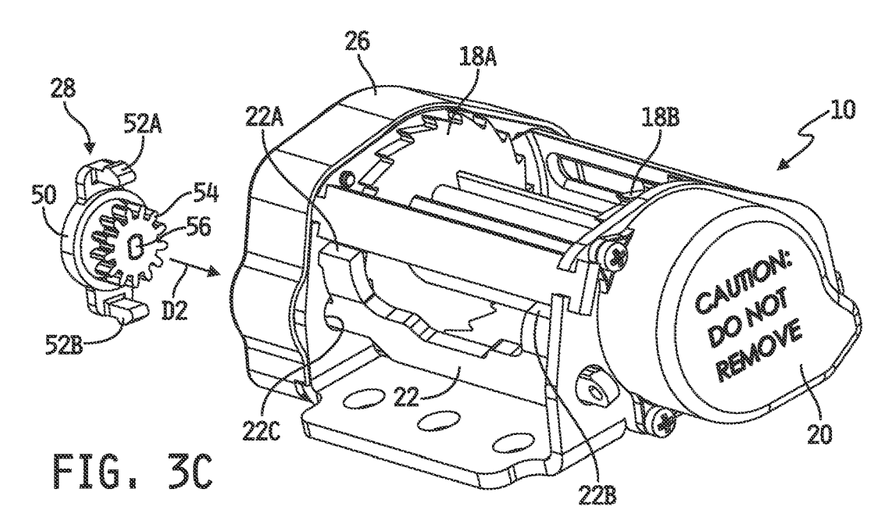
FIG. 3C is a perspective view of the subassembly of FIG. 3A shown from an opposite side of the retractor.

In the illustrated embodiment, and for purposes of this disclosure, the outer periphery of the wheel 38 is toothed for the purpose of operatively engaging the rotary damper 28. Referring now to FIGS. 3A-3C, the cover or housing 26 is shown mounted to the side wall 12A of the frame 12. In some embodiments, a seal, e.g., an elastomeric member, adhesive, gasket, etc., may be positioned about the periphery of the side wall 12A and/or cover 26 to form a seal between the outer surface of the side wall 12A and the cover 26 to thereby protect the spool shaft locking components 24A from ingress of moisture, dust, dirt, etc. In alternate embodiments, no such seal may be provided. In any case, the cover or housing 26 is illustratively mounted to the side wall 12A of the frame 12 via a number of conventional fixation members, e.g., screws or bolts, although in other embodiments any conventional fixation members and/or media may be used, examples of which include, but are not limited to, rivets, clips, a combination of protrusions integral with or attached to the cover 26 and/or side wall 12A and receiving slots or bores defined in the side wall 12A and/or cover, one or more clips integral with or attached to the cover 26 and/or side wall 12A and configured to engage and couple to the side wall 12A and/or cover at least partially about their peripheries, one or more adhesives, one or more bonding media, and the like.

In the illustrated embodiment, the cover or housing 26 defines an opening 40 therethrough and a pair of slots 42A, 42B respectively above and below the opening 40. The opening 40 is illustratively positioned relative to the cover or housing 26 so as to expose at least some of the teeth defined about the periphery of the gear or wheel 38 that is rotatably mounted to the spool shaft 14 as described above. The opening 40 is illustratively sized to receive therein a toothed gear or wheel 54 rotatably mounted via a rotatable shaft 56 to a body 50 of the rotary damper 28. In the illustrated embodiment, the gear or wheel 54 is affixed to the shaft 56 so that the gear or wheel 54 and the shaft 56 together rotate relative to the body 50 of the rotary damper 28.

Engagement clips 52A, 52B extend axially away from the body 50 on respective top and bottom portions of the body 50. The engagement clips 52A, 52B are configured to be received within, and engage so as to be coupled to, respective ones of the slots 42A, 42B defined in the housing or cover 26 about the opening 40. As the gear or wheel 54 is received within the opening 40, at least some of the teeth defined about the periphery of the gear or wheel 54 intermesh with at least some of the teeth defined about the periphery of the gear or wheel 38 that are exposed by the opening 40, and the clips 52A, 52B enter and engage with the slots 42A, 42B respectively defined in the cover or housing 26. Via the intermeshed teeth, rotation of the gear or wheel 38 by rotation of the spool shaft 14 causes the gear or wheel 54 of the rotary damper 28 to likewise rotate, e.g., in a rotational direction opposite that of the gear or wheel 38. In some embodiments, a conventional seal may be provided about the inner periphery of the body 50 so as to form a seal between the body 50 and the cover or housing 26 as the rotary damper 28 is operatively mounted to the cover or housing 26 as just described.

The rotary damper 28 is configured to resist rotation of the gear or wheel 54 in at least one rotational direction thereof; that is, the rotary damper 28 is configured to impart or apply a resistance or drag torque to the gear or wheel 54 in at least one rotational direction thereof. In one embodiment, for example, the rotary damper 28 is configured to impart or apply the resistance or drag torque to the gear or wheel 54 only in a rotational direction which imparts or applies the resistance or drag torque to the spool shaft 14, via the intermeshed teeth of the gears or wheels 38 and 54, when the spool shaft 14 is rotating in the web take up direction. As a result, the speed of web take up onto the spool 16 of the web retractor 10, entirely controlled in the absence of the rotary damper 28 by the main spring or power spring of the power spring assembly 20, is slowed by the rotary damper 28 so as to avoid or at least reduce so-called "flyback" of the web to thereby avoid or reduce uncontrolled and potentially dangerous movement of a tongue or other releasable engagement member coupled to the web and/or to avoid or at least reduce so-called "reverse locking" of the web retractor to thereby avoid or reduce the likelihood of locking the web retractor 10 due to high rotational speed of the spool shaft 14 rotating in the web take up direction under control of the power spring assembly 20 alone. In this regard, the rotary damper 28 can be configured or selected to impart or apply any amount of drag torque to the spool shaft 14 to cause the spool shaft 14 to rotate in the web take up direction with any fraction of the rotational speed that would be applied or imparted to the spool shaft by the power spring assembly 20 in the absence of the rotary damper 28.

In some alternate embodiments, the rotary damper 28 may be configured to impart or apply the resistance or drag torque to the gear or wheel 54 only in a rotational direction which imparts or applies the resistance or drag torque to the spool shaft 14, via the intermeshed teeth of the gears or wheels 38 and 54, when the spool shaft 14 is rotating in the web pay out direction. In other alternate embodiments, the rotary damper 28 may be configured to impart or apply the resistance or drag torque to the gear or wheel 54 in both rotational directions, i.e., when rotating clockwise and counterclockwise, which will impart or apply resistance or drag torque to the spool shaft 14, via the intermeshed teeth of the gears or wheels 38 and 54, when the spool shaft 14 is rotating in the web take up direction or in the web pay out direction.

The rotary damper 28 may illustratively be configured in any conventional manner to impart or apply resistance or drag torque to the gear or wheel 54 in either rotational direction thereof. In some embodiments, for example, the body 50 may be at least partially filled with a viscous or gelatinous medium, e.g., silicone, and rotation of the gear or wheel 54 and shaft 56 in one direction and/or the other may be thereby impeded. Other conventional media, structure(s), or the like may be alternatively or additionally used to create the resistance or drag torque against which the gear or wheel 54 rotates. In any case, the rotary damper 28 may be configured to impart or apply a constant or relatively constant amount resistance or drag torque in either or both rotational directions. Such configurations may be used, for example, but not exclusively, in embodiments in which the power spring assembly is configured to impart a constant or relatively constant rotational drive force onto the spool shaft 14. In other embodiments, the rotary damper 28 may be configured to impart a non-linear amount of resistance or drag torque in either or both rotational direction depending, for example, on varying rotational speeds of the spool shaft 14. In embodiments in which the rotary damper 28 is configured to impart or apply resistance or drag torque to the gear or wheel 54 in both rotational directions thereof, the rotary damper 28 may be configured such that the resistance or drag torque is the same in both rotational directions or is different in one rotational direction than in the opposite rotational direction.

While the damper 28 illustrated in the attached figures and described above is implemented in the form of a rotary damper, i.e., one in which the rotational motion of a gear or wheel 54 is damped in at least one rotational direction thereof, it will be understood that in other embodiments a linear, piece-wise linear or non-linear damper may be configured to be mounted to the cover 26 and/or the side wall 12A of the frame 12 and/or to one or more components 24A, and to operatively engage the teeth of the gear or wheel 38 as described above, to operatively engage another structure rotating and by the spool shaft 14 or to operatively engage the spool shaft 14 itself. As one non-limiting example, teeth defined on an elongated, linear, piece-wise linear or non-linear track may be intermeshed with teeth of the gear or wheel 38, and the track may be configured to move linearly, piece-wise linearly or non-linearly against a resistive medium or structure as the gear or wheel 38 rotates, thereby imparting or applying the resistance or drag torque to the gear or wheel 38. Other examples will occur to those skilled in the art, and it will be understood that any such alternate damper is intended to fall within the scope of this disclosure.

Referring now to FIGS. 4A-5B, another embodiment is shown of a damped web retractor 10'. The embodiment 10' illustrated in FIGS. 4A-5B shares several components in common with the embodiment 10 illustrated in FIGS. 1-3B, and like numbers are used in FIGS. 4A-5B to identify such common components. The embodiment 10' shown in FIGS. 4A-5B illustratively differs from that illustrated in FIGS. 1-3B in that the web guide 15' is movably coupled to the frame 12. In the illustrated embodiment, the web guide 15' includes a guide plate 15B defining therethrough a profiled web slot 15A' through which a web 60 passes. One end of the web 60 is coupled to the spool 16, as described above with respect to FIGS. 1-3B, and an opposite end of the web 60 may illustratively be coupled to a releasable engagement member, and between such two ends the web 60 passes through the web slot 15A' defined through the guide plate 15B of the web guide 15'.

The web guide 15' illustratively includes a pair of legs 15C, 15D (only leg 15C shown) extending away from the guide plate 15B, with each leg 15C, 15D defining an opening therethrough at or near a respective end thereof through which the spool shaft 14 passes. With the spool shaft 14 passing therethrough, the leg 15C is positioned between, and in contact with, the toothed wheel 18B and the side wall 12B of the frame 12, and the leg 15D is positioned between, and in contact with, the toothed wheel 18A and the side wall 12A of the frame 12. The legs 15C, 15D illustratively locate the web guide 15' relative to the spool 16 of the retractor 10', and provide bearing surfaces between the toothed wheels 18A, 18B and the respective side walls 12A, 12B of the frame 13. Friction between the toothed wheels 18A, 18B and the respective legs 15C, 15D of the web guide 15' causes the wheels 18A, 18B to rotate or pivot the web guide 15', relative to the frame 12, between the web pay out position illustrated in FIGS. 4A, 4B and the web take up position illustrated in FIGS. 5A, 5B. In some embodiments, the leg 15C and/or the leg 15D and/or the respective side wall 12B and/or 12A of the frame 12 may define a stop for limiting upward rotation of the web guide 15' to the web payout position illustrated by example in FIGS. 4A and 4B. In alternate embodiments, the retractor 10' may not include such a stop. In some embodiments, the bottom wall 12C of the frame 12 defines a stop for limiting downward rotation of the web guide 15' to the web take up position, e.g., by contacting the guide plate 15B as illustrated by example in FIGS. 5A and 5B. In alternate embodiments, the leg 15C and/or the leg 15D and/or the respective side wall 12B and/or 12A of the frame 12 may define a stop for limiting downward rotation of the web guide 15' to a different web take up position in which the guide plate 15B is spaced apart from the bottom wall 12C of the frame 12.

Figure 4A:
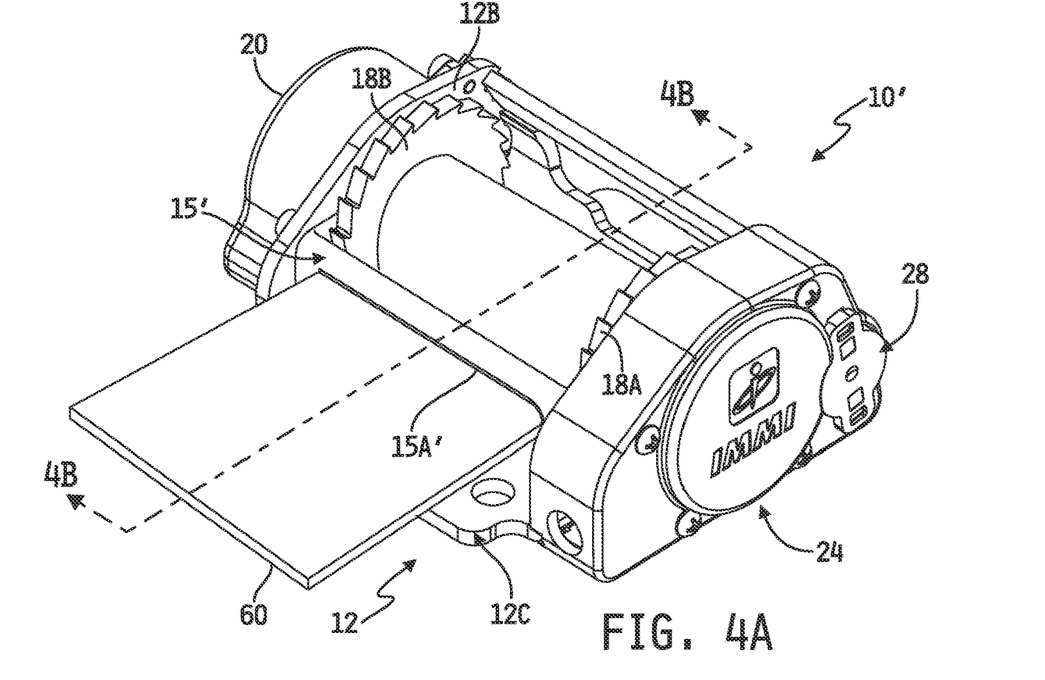
FIG. 4A is a perspective view of another embodiment of a damped web retractor illustrated in a state in which web is being dispensed therefrom via a spool rotating in a web pay out direction.
Figure 4B:
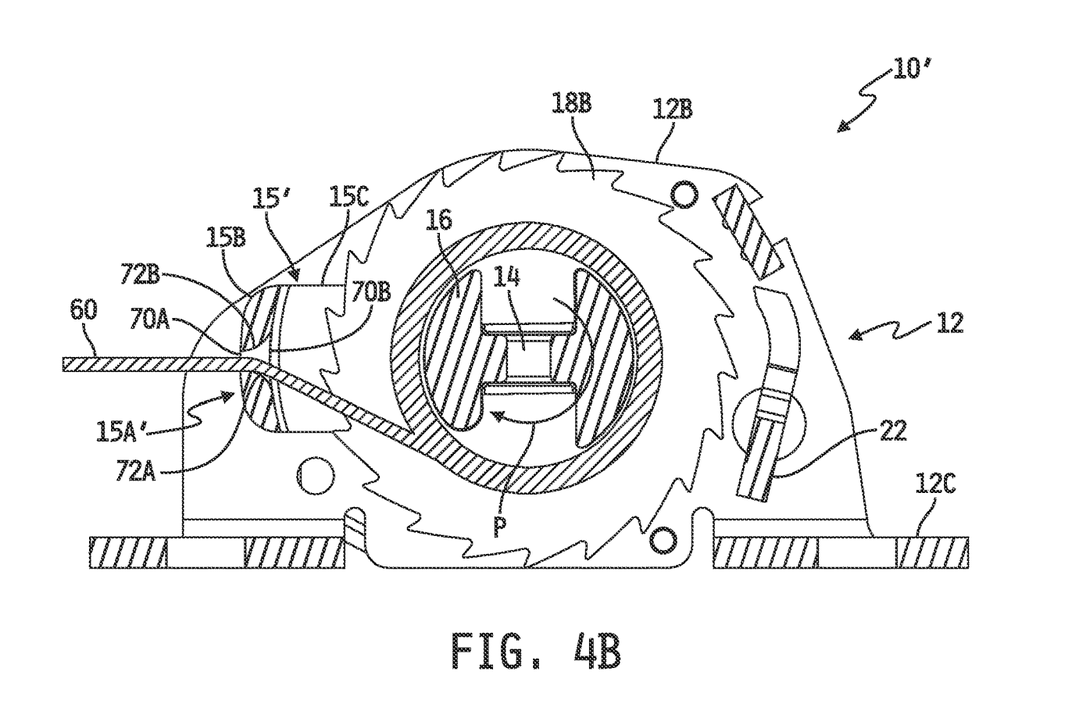
FIG. 4B is a cross-sectional view of the damped web retractor of FIG. 4A as viewed along section lines 4B-4B.
Figure 5A:
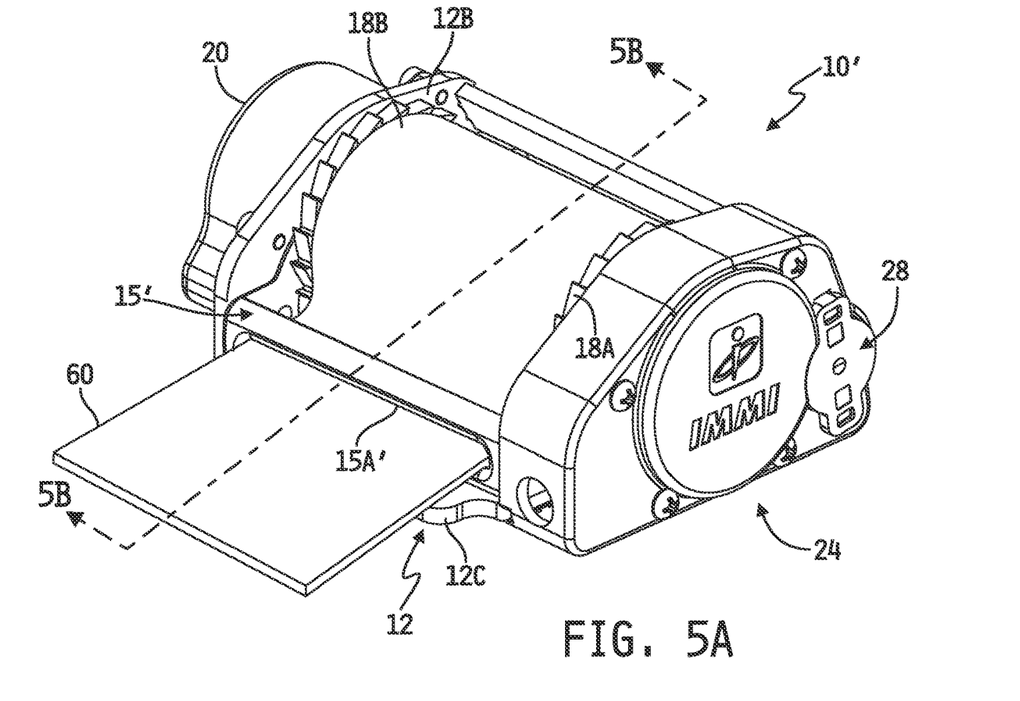
FIG. 5A is a perspective view of the damped web retractor of FIGS. 4A and 4B illustrated in a state in which web is being retracted therein via the spool rotating in a web take up direction.
Figure 5B:
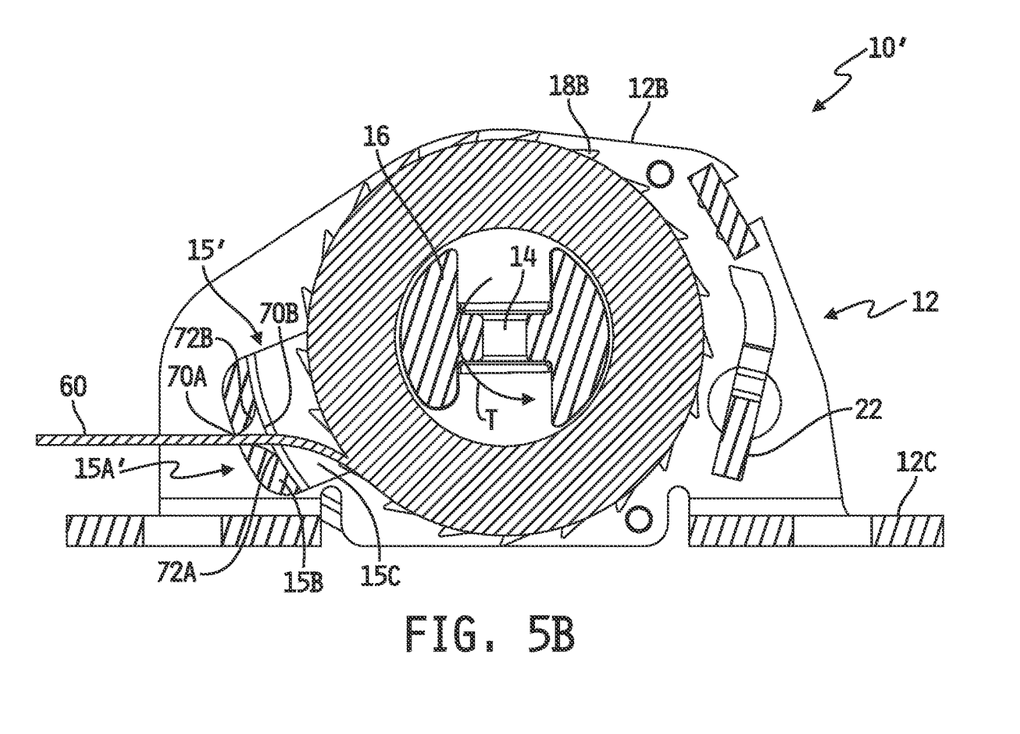
FIG. 5B is a cross-sectional view of the damped web retractor of FIG. 5A as viewed along section lines 5B-5B.

As best shown in FIGS. 4B and 5B, the web slot 15A' is illustratively profiled so as to not restrict, or to only minimally restrict, passage of the web 60 therethrough in the web pay out position of the web guide 15' (FIG. 4B), and to restrict passage of the web 60 therethrough in the web take up position of the web guide 15' (FIG. 5B) so as to reduce the retraction force, i.e., the torque applied to the spool 14 by the main spring assembly 20, during web take up. In the illustrated embodiment, the web slot 15A' defines a first width 70A at an opening of the slot 15A' defined along an outward or external face of the guide plate 15B ("front opening"), and a second width 70B at an opposite opening of the slot 15A' defined along an inward or internal face of the guide plate 15B ("rear opening"). Between the front and rear openings of the web slot 15A', the guide plate 15B illustratively defines a bottom sloped or tapered (e.g., rounded) surface 72A along a bottom surface of the slot 15A' and a top sloped or tapered (e.g., rounded) surface 72B along a top surface of the slot 15A'. Illustratively, the radius of the bottom tapered surface 72A is less than that of the top sloped surface 72B, although in alternate embodiments the two radii may be the same or the radius of the surface 72A may be greater than the radius of the surface 72B.

Referring specifically to FIG. 4B, as the web 60 is extracted from the retractor 10', the spool 16, spool shaft 14 and toothed wheels 18A, 18B all rotate in the web payout direction P against the torque applied to the spool shaft 14 in the web take up direction by the power spring assembly 20. Friction between the rotating toothed wheels 18A, 18B and the respective legs 15C, 15D of the web guide 15', and/or friction between the legs 15C, 15D and the respective side walls 12B, 12A of the frame 12, causes the wheels 18A, 18B to rotate or pivot the web guide 15', relative to the frame 12, between the web take up position illustrated in FIGS. 5A and 5B to the web payout position illustrated in FIGS. 4A and 4B. Such repositioning of the web guide 15' to the web payout position causes the web 60 to ride on the bottom tapered surface 72A of the guide plate 15B as the web 60 is drawn from the retractor 10' with the spool 16, spool shaft 14 and toothed wheels 18A, 18B all rotating in the web payout direction P. In some embodiments, the radius of the bottom tapered surface 72A of the guide plate 15B is sufficiently large so as to minimize the extraction force of the web 60 in the web pay out direction, or to at least add only an acceptably low amount of extraction force to the web 60 as it is being drawn from the retractor 10'. In alternate embodiments, the radius of the bottom tapered surface 72A of the guide plate 15B may be designed to have any particular value selected to impart or apply a desired amount of drag force to the web 60 as it is being drawn from the retractor 10', i.e., so as to set a desired extraction force of the web 60 in the web pay out direction.

Referring specifically to FIG. 5B, as the web 60 is retracted into the retractor 10', the spool 16, spool shaft 14 and toothed wheels 18A, 18B all rotate in the web take up direction T under the torque applied to the spool shaft 14 in the web take up direction by the power spring assembly 20. Friction between the rotating toothed wheels 18A, 18B and the respective legs 15C, 15D of the web guide 15', and/or friction between the legs 15C, 15D and the respective side walls 12B, 12A of the frame 12, causes the wheels 18A, 18B to rotate or pivot the web guide 15', relative to the frame 12, between the web pay out position illustrated in FIGS. 4A and 4B to the web take up position illustrated in FIGS. 5A and 5B, e.g., with the guide plate 15B in contact with the bottom wall 12C of the frame 12. Such repositioning of the web guide 15' to the web take up position causes the web 60 to ride on the top tapered surface 72B of the guide plate 15B, or on both the top and bottom tapered surfaces 72A, 72B of the guide plate 15B, as the web 60 is taken up on the spool 16 as the spool 16, spool shaft 14 and toothed wheels 18A, 18B all rotate in the web take up direction T in response to torque applied to the spool shaft 14 by the power spring assembly 20. In some embodiments, the radius of the top tapered surface 72B of the guide plate 15B, and in some embodiments also the radius of the bottom tapered surface 72A, is selected to be sufficiently small so as to reduce the retraction force of the web 60 in the web take up direction to an acceptable amount of retraction force to the web 60 as it is being retracted into the retractor 10'. In alternate embodiments, the radius of the top tapered surface 72B, and in some embodiments also the radius of the bottom tapered surface 72A, of the guide plate 15B may be designed to have any particular value selected to impart or apply a desired amount of drag force to the web 60 as it is being retracted into the retractor 10', i.e., so as to set a desired retraction force of the web 60 in the web take up direction.

In some embodiments, as illustrated by example in FIGS. 4A-5B, the web retractor 10' may be configured to include both the web guide 15' and the damper 28 such that both the web guide 15' and the damper 28 operate to damp rotation of the web spool 16 in at least one rotational direction thereof, e.g., to reduce the retraction force applied to the spool shaft 14, spool and toothed wheels 18A, 18B rotating together in the web take up direction under bias of the power spring assembly 20. In other embodiments, the damper 28 may be omitted such that only the web guide 15' operates to damp rotation of the web spool 16 in at least one rotational direction thereof, e.g., to reduce the retraction force applied to the spool shaft 14, spool and toothed wheels 18A, 18B rotating together in the web take up direction under bias of the power spring assembly 20. In still other embodiments, the web guide 15' may be omitted in favor of the web guide 15 of FIGS. 1-3B or other conventional web guide (or no web guide at all), such that only the damper 28 operates to damp rotation of the web spool 16 in at least one rotational direction thereof, e.g., to reduce the retraction force applied to the spool shaft 14, spool and toothed wheels 18A, 18B rotating together in the web take up direction under bias of the power spring assembly 20. In any case, the web guide 15' and/or the damper 28 may be used to damp the speed of web take up onto the spool 16 of the web retractor 10, 10' which is otherwise entirely controlled in the absence of the web guide 15' and/or damper 28 by the main spring or power spring of the power spring assembly 20. In one example implementation, the web guide 15' and/or the damper 28 may thus be used to reduce the retraction force of the web 60 so as to avoid or at least reduce so-called "flyback" of the web to thereby avoid or reduce uncontrolled and potentially dangerous movement of a tongue or other releasable engagement member coupled to the web and/or to avoid or at least reduce so-called "reverse locking" of the web retractor to thereby avoid or reduce the likelihood of locking the web retractor 10, 10' due to high rotational speed of the spool shaft 14 rotating in the web take up direction under control of the power spring assembly 20 alone. In this regard, the web guide 15' and/or the damper 28 can be configured or selected to impart or apply any amount of drag torque to the web 60 or the spool shaft 14 respectively to cause the spool shaft 14, web spool 16 and toothed wheels 18A, 18B to rotate together in the web take up direction with any fraction of the rotational speed that would be applied or imparted to the spool shaft 14 by the power spring assembly 20 in the absence of the web guide 15' and/or the damper 28.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. For example, in one alternate embodiment, the rotary damper 28 may be configured such that the body 50 is affixed or mounted to, or is integral with, the interior surface of the cover 26 or to the interior surface of the cover of the power spring assembly 20 (and/or to/with one or more structures fixed in position relative to the interior surface of the cover 26 or the cover of the power spring assembly 20) and such that the end 14A of the spool shaft 14 (or the opposite end of the spool shaft 14) and the shaft 56 and/or gear or wheel 54 are complementarily configured to engage one another such that the spool shaft 14 and the shaft 56 and/or gear/when 54 rotate together relative to the cover 26 (or to the cover of the power spring assembly 20) to which the body 50 is mounted or with which the body 50 is integral. In this example alternate embodiment, the resistance or drag torque of the rotary damper 28 is applied directly to the to the spool shaft 14 (relative to the cover 26 or the cover of the power spring assembly 20 and/or one or more structures fixed thereto).

What is claimed is:

1. A damped web retractor, comprising:
a frame,
a spool including a spool shaft rotatably mounted to the frame, the spool configured to couple to one end of a web such that the web wraps around the spool as the spool shaft rotates relative to the frame in a web take up direction and such that the web unwraps from the spool as the spool shaft rotates in a web pay out direction, and
a damper operatively coupled to the spool shaft at all times, the damper configured to resist rotation of the spool shaft at any rotational speed in the web take up direction.

2. The damped web retractor of claim 1, wherein the damper comprises a rotary damper including a rotatable shaft coupled to a body and configured to resist rotation relative to the body in the web take up direction.

3. The damped web retractor of claim 2, wherein the body of the rotary damper is fixed in position relative to the frame.

4. The damped web retractor of claim 2, further comprising a first toothed wheel mounted to the spool shaft such the first toothed wheel rotates with the spool shaft, and
a second toothed wheel mounted to the rotatable shaft of the rotary damper such that the second toothed wheel rotates with the rotatable shaft of the rotary damper,
wherein the teeth of the first toothed wheel mesh with teeth of the second toothed wheel such that rotation of the first toothed wheel by the spool shaft rotates the second toothed wheel relative to the body of the rotary damper to thereby resist rotation of the spool shaft in the web take up direction.

5. The damped web retractor of claim 2, wherein the rotary damper includes at least one damping material configured to resist rotation of the rotatable shaft relative to the body in the web take up direction.

6. The damped web retractor of claim 5, wherein the body contains the damping material in the form of a damping medium or structure configured to resist rotation of the rotatable shaft in the web take up direction.

7. The damped web retractor of claim 1, further comprising a power spring assembly configured to bias rotation of the spool shaft in the web take up direction,
and wherein the damper is configured to resist rotation of the spool shaft in the web take up direction to slow rotational speed of the spool shaft in the web take up direction against the biased rotation of the spool shaft by the power spring assembly in the web take up direction.

8. The damped web retractor of claim 1, further comprising:
a flexible web, and
a web guide movably mounted to the frame and defining a slot through which the web passes, the web guide moving to a web payout position relative to the frame in response to rotation of the spool in the web payout direction, and the web guide moving to a web take up position relative to the frame in response to rotation of the spool in the web take up direction, the slot of the web guide configured to engage the web in the web take up position of the web guide so as to further resist rotation of the spool shaft in the web take up direction.

9. The damped web retractor of claim 1, further comprising:
a toothed wheel mounted to the spool shaft such that the toothed wheel rotates with the spool shaft,
a locking pawl movably mounted to the frame, and
a spool shaft control assembly operatively coupled to the spool shaft and to the locking pawl, the spool shaft control assembly configured to be responsive to an inertial locking condition to move the locking pawl into engagement with the toothed wheel to prevent rotation of the spool shaft in the web payout direction.

10. The damped web retractor of claim 9, further comprising a power spring assembly configured to bias rotation of the spool shaft in the web take up direction with the locking pawl engaged with the toothed wheel to prevent rotation of the spool shaft in the web payout direction,
wherein, with the locking pawl engaged with the toothed wheel, the damper is configured to resist rotation of the spool shaft in the web take up direction to slow rotational speed of the spool shaft in the web take up direction against the biased rotation of the spool shaft by the power spring assembly in the web take up direction.

11. A damped web retractor, comprising:
a frame,
a flexible web,
a spool including a spool shaft rotatably mounted to the frame, the spool configured to couple to one end of the web such that the web wraps around the spool as the spool shaft rotates relative to the frame in a web take up direction and such that the web unwraps from the spool as the spool shaft rotates in a web pay out direction, and
a web guide movably mounted to the frame and defining a slot through which the web passes, the web guide moving to a web payout position relative to the frame in response to rotation of the spool in the web payout direction, and the web guide moving to a web take up position relative to the frame in response to rotation of the spool in the web take up direction, the slot of the web guide configured to engage the web in take up position of the web guide so as to damp rotation of the spool shaft in the web take up direction.

12. The damped web retractor of claim 11, further comprising a power spring assembly configured to bias rotation of the spool shaft in the web take up direction,
and wherein the slot is configured to engage the web in the web take up position of the web guide so as to damp rotational speed of the spool shaft rotating in the web take up direction under torque applied thereto by the power spring assembly.

13. The damped web retractor claim 11, further comprising a damper operatively coupled to the spool shaft, the damper configured to resist rotation of the spool shaft in the web take up direction.

14. The damped web retractor of claim 13, wherein the damper comprises a rotary damper including a rotatable shaft coupled to a body and configured to resist rotation relative to the body in the web take up direction.

15. The damped web retractor of claim 14, wherein the body of the rotary damper is fixed in position relative to the frame.

16. The damped web retractor of claim 14, further comprising a first toothed wheel mounted to the spool shaft such the first toothed wheel rotates with the spool shaft, and
a second toothed wheel mounted to the rotatable shaft of the rotary damper such that the second toothed wheel rotates with the rotatable shaft of the rotary damper,
wherein the teeth of the first toothed wheel mesh with teeth of the second toothed wheel such that rotation of the first toothed wheel by the spool shaft rotates the second toothed wheel relative to the body of the rotary damper to thereby resist rotation of the spool shaft in the web take up direction.

17. The damped web retractor of claim 14, wherein the rotary damper includes at least one damping material configured to resist rotation of the rotatable shaft relative to the body in the web take up direction.

18. The damped web retractor of claim 17, wherein the body contains the damping material in the form of a damping medium or structure configured to resist rotation of the rotatable shaft in the web take up direction.

19. The damped web retractor of claim 11, further comprising:
a toothed wheel mounted to the spool shaft such that the toothed wheel rotates with the spool shaft,
a locking pawl movably mounted to the frame, and a spool shaft control assembly operatively coupled to the spool shaft and to the locking pawl, the spool shaft control assembly configured to be responsive to an inertial locking condition to move the locking pawl into engagement with the toothed wheel to prevent rotation of the spool shaft in the web payout direction.

20. The damped web retractor of claim 19, further comprising a power spring assembly configured to bias rotation of the spool shaft in the web take up direction with the locking pawl engaged with the toothed wheel to prevent rotation of the spool shaft in the web payout direction, wherein, with the locking pawl engaged with the toothed wheel, the slot of the web guide, in the web take up position of the web guide, is configured to engage the web so as to resist rotation of the spool shaft in the web take up direction to slow rotational speed of the spool shaft in the web take up direction against the biased rotation of the spool shaft by the power spring assembly in the web take up direction.

* * * * *